United States Patent
Thelen et al.

[19]

[11] Patent Number: 6,007,252
[45] Date of Patent: Dec. 28, 1999

[54] SUPPORT STRUCTURE WITH A VIBRATION DAMPER FOR ROTATABLY HOLDING A ROTATABLE BODY

[75] Inventors: Dieter Thelen, Modautal; Michael Stork, Darmstadt, both of Germany

[73] Assignee: Schenk RoTec GmbH, Darmstadt, Germany

[21] Appl. No.: 08/916,982

[22] Filed: Aug. 13, 1997

[30] Foreign Application Priority Data

Aug. 15, 1996 [DE] Germany ............... 196 32 786

[51] Int. Cl.$^6$ ............................................ F16C 27/04
[52] U.S. Cl. ............................................ 384/535
[58] Field of Search ............... 384/536, 535, 384/563, 581, 582

[56] References Cited

U.S. PATENT DOCUMENTS

| | | | |
|---|---|---|---|
| 3,672,734 | 6/1972 | Bando | 384/536 |
| 3,754,801 | 8/1973 | Giers et al. | |
| 3,961,829 | 6/1976 | Bowen | 384/536 |
| 4,179,923 | 12/1979 | Dodt | |
| 4,543,825 | 10/1985 | Schönfeld et al. | |
| 4,854,751 | 8/1989 | Grassmuck et al. | 384/536 |
| 5,463,861 | 11/1995 | Lorenz | 384/536 |
| 5,509,667 | 4/1996 | Klein et al. | |

FOREIGN PATENT DOCUMENTS

| | | |
|---|---|---|
| 343384 | 5/1978 | Austria . |
| 1178303 | 9/1964 | Germany . |
| 2727080 | 12/1978 | Germany . |
| 2809453 | 9/1979 | Germany . |
| 2942379 | 4/1981 | Germany . |
| 3332978 | 3/1984 | Germany . |
| 3903814 | 8/1990 | Germany . |
| 4234434 | 4/1994 | Germany . |
| 61-084539 | 4/1986 | Japan . |

*Primary Examiner*—Lenard A. Footland
*Attorney, Agent, or Firm*—W. F. Fasse; W. G. Fasse

[57] ABSTRACT

A support structure with a vibration damper permits rotatably holding a rotatable body to be balanced, without applying undesirable constraining forces to the rotor or wheel. The vibration damper is an elastomeric element, for example a metal rubber composite element, inserted between the rotatable body and a support which itself is separately mounted by spring elastic mountings in a machine frame. The vibration damping element is effective between the rotatable body and the support if the element is inserted between a bearing and the rotatable body or if the element is inserted between the bearing and the support.

25 Claims, 3 Drawing Sheets

SUPPORT STRUCTURE WITH A VIBRATION DAMPER FOR ROTATABLY HOLDING A ROTATABLE BODY

FIELD OF THE INVENTION

The invention relates to a support structure or device for a rotatable body such as a rotor, wheel or the like, having an unbalance that is to be determined. The support structure includes a nonrotating section referred to as a support which is spring mounted in a machine frame and a rotating section mounted in or on the support for holding the rotatable body. Vibrations induced in the support by the unbalance are used to determine the size of the unbalance.

BACKGROUND INFORMATION

Rotatable bodies referred to herein as "rotors" to be balanced are conventionally mounted or supported in balancing machines by support rollers or by a support spindle. Antifriction bearings or slide bearings are used to mount the support rollers or the support spindle in the balancing machine.

If it is necessary to balance or control rotors that are rotating at an r.p.m. close to their critical revolutions per minute, which could cause the system of the rotor and its support structure to resonate, measures are necessary which avoid dangerous resonant amplifications. Simultaneously it is necessary to keep the system of the rotor and its support structure free of any imposed or undesired constraining forces.

According to German Patent Publication DE-OS 2,141, 502, corresponding to U.S. Pat. 3,754,801 (Giers et al.), issued on Aug. 28, 1973, it is known to equip a balancing machine so that it permits changing the resonance frequencies of the system formed by the rotor and its support structure. The conventional construction makes it possible to vary the resonance frequencies of the system in such a way that passing of the system through resonance peaks is avoided. More specifically, the resonance frequencies are controlled so that resonance peaks are avoided during a test sequence. For this purpose the above mentioned disclosure of the German and corresponding U.S. Pat. 3,754,801 provides for additional supports one end of which is rigidly secured to the machine foundation in a force transmitting, formlocking or positive manner while the other end of the additional supports is connected to a support housing through a friction coupling that is remote controllable for temporarily detuning the system of the rotor and its support structure formed by support rollers or a support spindle mounted in the support housing. However, the need for the additional supports makes the known balancing machine involved and hence expensive.

OBJECTS OF THE INVENTION

In view of the above it is the aim of the invention to achieve the following objects singly or in combination:

to provide a simple and cost efficient bearing or support structure for rotors that are to be balanced or an unbalance of which is to be ascertained;

to assure that such a support structure permits the balancing operation or controlling of the rotor at various r.p.m.s and without any imposition of external force components to assure a certain consistently repeatable balancing or rotor control;

to construct a balancing apparatus so that it is compact and economical, yet fully capable of the required balancing operation; and to provide a controllable damping of resonance vibrations, whereby the damping shall be easily adaptable with regard to different critical r.p.m.s or critical r.p.m. ranges.

SUMMARY OF THE INVENTION

The above objects have been achieved according to the invention in that at least one vibration damping element is inserted between the rotor and a support which itself is spring mounted in the machine. The rotatable body is supported by at least one bearing member which may be an antifriction bearing, a sleeve bearing, or carrier rollers mounted in or on the support. The deformation of the vibration damping element provides a simple and effective damping of the frequencies involved without substantially reducing the dynamic stiffness of the bearing and support system. It has been further found, that such a vibration damping element does not cause phase errors in the r.p.m. range close to the critical r.p.m.s, which is an advantage of the invention. Such phase errors might falsify the vibrations that are measured for ascertaining an unbalance of the rotor. The present vibration damping elements avoid such phase errors. The vibration damping element may be positioned between the rotor and the bearing member or between the support and the bearing member. Both positions are between the rotor and the support.

One embodiment of the vibration damping element is constructed as an elastomeric elastically deformable component. Such components are effective, yet have an especially small structural volume. Additionally, a further advantage is seen in their cost efficiency. Another embodiment in which the elastically deformable vibration damping element is constructed as a metal elastomer composite component, is robust in its handling and in its use with the added advantage that such metal elastomer composite components can be manufactured, not only economically, but also with high precision. The elastomeric components are to be constructed so that the damping of the system including the rotor and its support is increased by a factor within the range of 2 to 3 compared to conventional systems.

According to a further embodiment of the invention the vibration damping element is so constructed that a defined biasing force can be applied to the damping element to thereby control or adjust the damping characteristic in a simple manner. Such control of the damping characteristic is especially simple to accomplish by adjusting a hydraulic biasing force to thereby achieve an adaptation of the damping characteristic to different critical r.p.m.s or r.p.m. ranges while still avoiding the imposition of undesirable constraining forces on the system for measuring an unbalance.

In a preferred embodiment the vibration damping element in the form of a metal elastomeric composite ring component, has two ring sections, each of which has an L-section configuration. Such ring sections can be produced cost efficiently and stock keeping is also simplified since the ring sections are easily standardized. An especially simple manufacturing is possible if the vibration damping element comprises several sections which are applying a damping effect either in an axial direction or in a radial direction. The axially effective damping sections are for example produced by stamping elastomeric ring disks out of elastomer sheet material while the radial damping sections are constructed as an elastomeric ring member such as a cylinder, preferably but not necessarily of circular cross-section.

An embodiment particularly adapted to a bearing member with two rotor carrier rollers for the rotor to be tested, comprises a vibration damping intermediate element preferably in the form of a multi-section element that is simple to install between the support and the carrier rollers.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
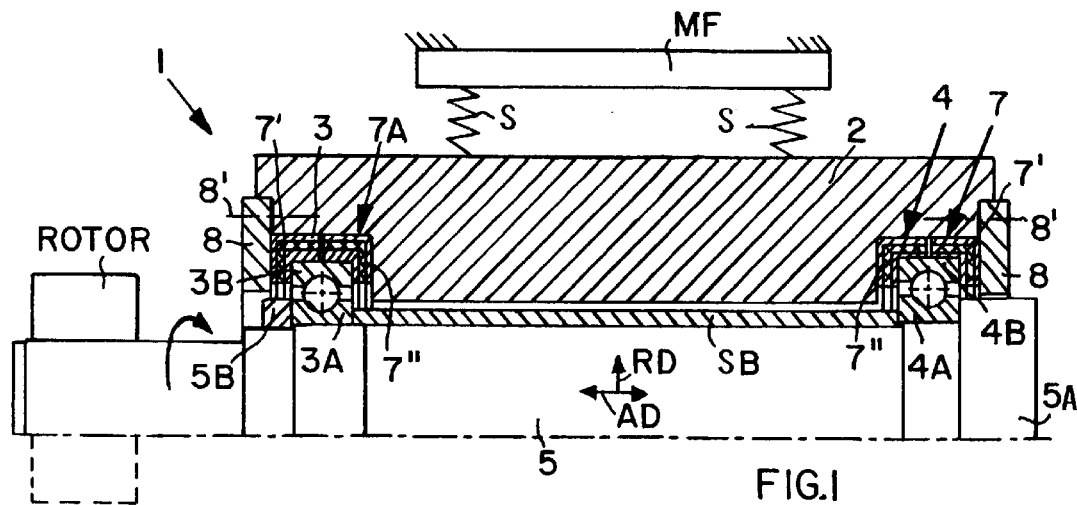
FIG. 1 illustrates, partially in section, a rotor and its support structure according to the invention including two bearings and a support for a spindle or shaft carrying a rotor to be tested in a balancing machine, with vibration damping elements between the bearings and the support.

FIG. 1 illustrates a balancing machine 1 having a support 2 go wherein a spindle or shaft 5 is mounted in bearings 3 and 4 such as antifriction bearings. A rotor to be tested is conventionally secured to the spindle or shaft 5. The rotor and its shaft 5 form a unit simply referred to as rotor 5, since the shaft rotates with the rotor or vice versa. The support 2 is mounted in a machine frame MF by spring elastic mounts S. Vibrations can take place in the radial direction RD and/or in the axial direction AD. The present vibration damper is preferably effective in both directions.

Each of the bearings 3 and 4 is of identical construction. Each bearing 3 and 4 has an inner race 3A, 4A, respectively, rigidly secured to the spindle or shaft 5 against circumferential and axial displacement. The inner races 3A, 4A are restrained against axial movement on the shaft 5 by a spacer bushing SB surrounding the shaft 5, whereby the inner races are axially held in place between a shoulder 5A and a shaft ring 5B. Thus, the inner races 3A, 4A rotate with the spindle or shaft 5. Each bearing 3, 4 also has an outer race 3B and 4B mounted according to the invention in the support 2 by a respective vibration damping element 7, 7A. In the embodiment of FIG. 1, each vibration damping element 7, 7A comprises two sections 7' and 7". These sections are axially restrained with the respective outer race 3B and 4B in the support 2 by mounting rings 8 held by screws 8' secured to the support 2.

Each vibration damping section 7', 7" of the vibration damping elements 7, 7A comprises an inner metal member, an intermediate elastomeric member, and an outer metal member. All members are bonded to each other and form a radially extending ring disk portion and an axially extending, preferably cylindrical portion of the respective damping section 7', 7". The axially extending cylindrical portion is radially effective as a vibration damping component. The radially extending ring disk portion is axially effective as a vibration damping component. The respective radially and axially extending portions form together an L-sectional configuration, whereby the radially extending portion of the L-sectional configuration bears against the axially facing outer bearing race 3B, 4B while the axially extending portion of the L-sectional-configuration surrounds the circumference of the respective outer bearing race 3B, 4B. The inner and outer metal ring portions of the respective vibration damping sections are preferably manufactured on a lathe as turned parts which do not yet have finished dimensions. These rings are then inserted into a jig with a spacing from each other and an elastomeric material is introduced into the spacing between the metal rings, whereby the elastomeric material is bonded to the metal rings, for example by application of heat or adhesive or both. The elastomeric material, or rather the characteristics thereof, are selected with due regard to the stiffness or rather the required damping characteristics. The elastomeric material may be into the spacing, for example by injection spraying rubber into the spacing or by pouring polyurethane into the spacing. However, the use to a rubber metal compound as vibration damping element is preferred, especially where high production numbers are required.

FIG. 1 shows that the spring elastic mounts S and the cylindrical portions forming axially extending but radially effective vibration damping components of the vibration damping elements or sections 7, 7A are arranged in series with each other.

Figure 2:
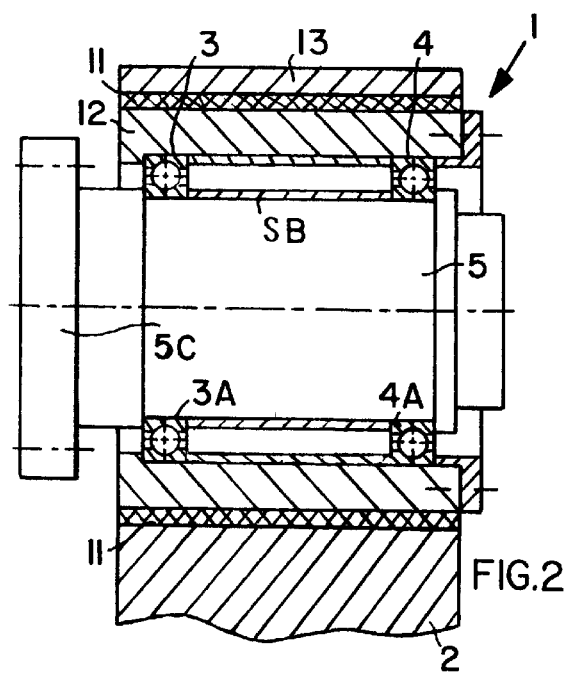
FIG. 2 illustrates in a sectional view similar to that of FIG. 1, a modified embodiment in which a vibration damping element is inserted as a ring in the support for the bearings of the spindle or shaft.

FIG. 2 illustrates a modified embodiment of a damping element 11 according to the invention in the form of a sleeve inserted between an inner bushing 12 and an outer section 13 of the support 2, whereby the vibration damping element 11 and the inner bushing 12 surround the pair of bearings 3 and 4 axially spaced from each other by a spacer bushing SB, so that a single vibration damping sleeve covers two bearings and still extends between the bearings and the support 2. The spindle or shaft 5 has a flange 5C to which a rotor to be tested can be attached. The rotor is not shown in FIG. 2. The spring mounting S of the balancing machine is secured between the support 2 and the machine bed, however these elements are shown in FIG. 1 but not in FIG. 2. The vibration damping element 11 is formed as a cylindrical sleeve that is bonded to the inner bushing 12 and then mounted in a respective support bore whereby the elastomeric sleeve 11 may also be secured, for example by adhesive bonding or any other suitable bonding known in connection with metal elastomer composites.

Figure 3:
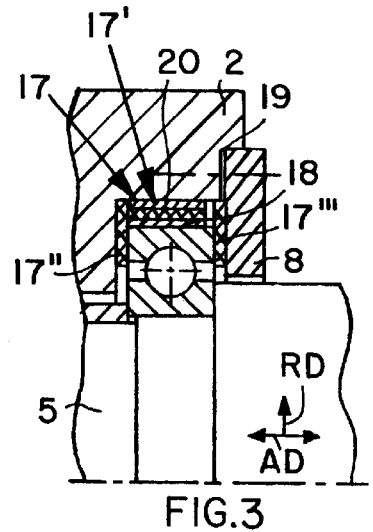
FIGS. 3 and 3A illustrate further embodiments of bearings equipped with sectional vibration damping elements according to the invention.

FIG. 3 illustrates a structurally simplified vibration damping element 17 comprising three sections 17', 17", and 17'''. The vibration damping functions in the axial direction are performed by the radially extending ring disks 17" and 17''' stamped out, for example from elastomeric sheet material. The radial damping function is performed by the sleeve section 17' of the damping element 17, whereby this sleeve 17' comprises a radially inner metal ring portion 18 and a radially outer metal ring portion 19 with an elastomeric ring section 20 inserted and bonded between the two ring portions 18 and 19 so that the composite element 17' has a cylindrical configuration, preferably but not necessarily with a circular cross-section.

Figure 3A:
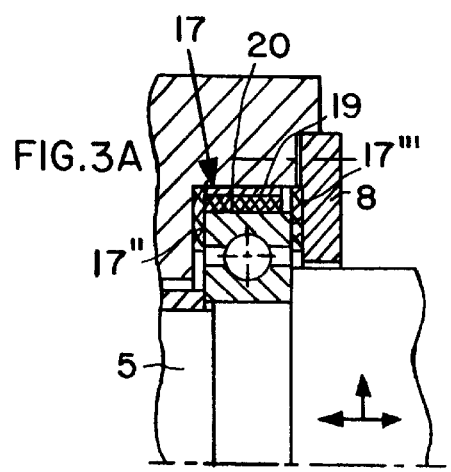

The embodiment of FIG. 3A is similar to that of FIG. 3 with the exception that the inner metal ring portion 18 has been omitted in FIG. 3A so that the elastomeric ring section 20 is directly bonded to the outer circumferential surface of the outer race of the respective bearing 3 or 4.

Figure 4:
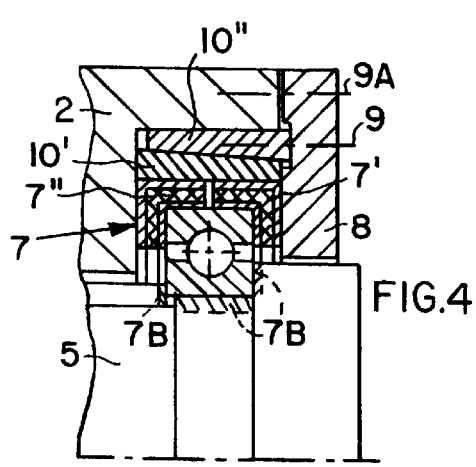
FIG. 4 shows a sectional view of a bearing with a vibration damping element having two sections cooperating with a biasing force applicator for changing the damping characteristic.

FIG. 4 illustrates a support structure with a device for applying an adjustable biasing force to the vibration damping element 7. More specifically, a radially inwardly directed biasing force component is applied to the cylindrical sections 7' and 7" of the vibration damping element 7 which is constructed substantially as in FIG. 1. The radially effective biasing force component for biasing the elastomeric cylindrical sections is applied by two wedging rings 10' and 10" including a radially inner wedging ring 10' having a radially outwardly facing conical surface and a radially outer wedging ring 10" having a radially inwardly facing conical surface cooperating with the radially outwardly facing surface of the inner ring 10'. The inner ring 10' is constructed as a chuck bushing which has a circumference that can be increased or decreased within a required relatively small range. The outer ring 10" is axially displaceable, for example by adjustment screws 9 passing through the cover ring 8 which in is rigidly fixed through screws 9A to the support 2 of the balancing machine 1. When operation of the screws 9 move the sleeves 10" axially to the left, the diameter of the inner ring 10' is slightly reduced because the ring 10' cannot yield axially, whereby a radially effective force component is applied radially inwardly to the elastomeric cylindrical portions of the vibration damping sections 7' and 7". When the outer ring 10" is moved by the screws 9 to the right in FIG. 4, the radially inwardly directed pressure on the inner ring 10' is relieved whereby the inner ring 10' can expand radially outwardly. Thus, a radial biasing force can be applied with a very fine control through the screws 9 to the inner ring 10' or this pressure can be relieved again. A similar structure may be employed to apply an axial pressure to the radially extending portions of the elastomeric sections 7', 7" also through screws in the mounting plate 8 and radially extending plates that are movable axially in response to the respective screw adjustment.

In the above described embodiments the vibration damping elements are inserted radially outwardly and axially outwardly of the outer race of the respective bearing. However, the vibration damping effect intended according to the invention can also be achieved by inserting elastomeric elements between the inner race of the bearings and the spindle or shaft 5 as shown by dashed lines 7B in FIG. 4.

The biasing force device described above with reference to FIG. 4 is equally applicable to the embodiment of FIG. 2, whereby the wedging rings 10' and 10" may be effective between the damping element 11 and the inner bushing 12 or between damping element 11 the outer section 13. In both embodiments the wedging rings are preferably axially adjustable for increasing or decreasing the radially effective biasing force component.

Figure 5:
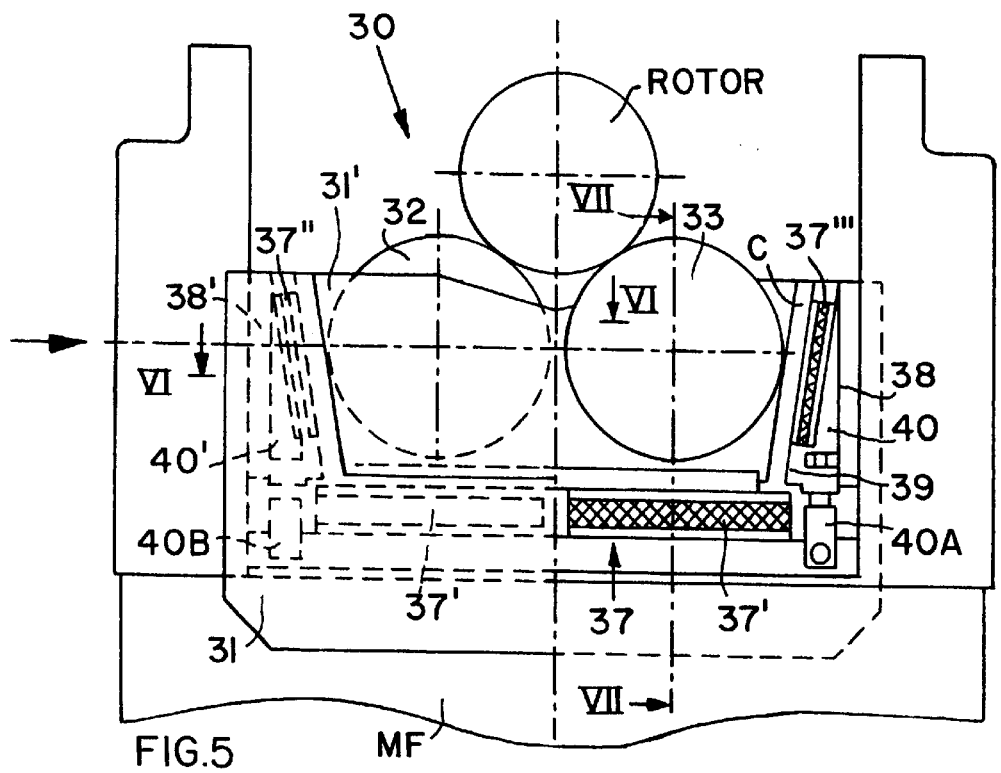
FIG. 5 shows an end view of another embodiment of a support structure according to the invention with two carrier rollers forming the bearing member for a rotor to be tested in a balancing machine with a plurality of vibration damping sections between a support and the carrier rollers.

FIG. 5 shows, partially in section, an end view of a bearing member in the form of a set 30 of two carrier rollers 32 and 33 rotatably mounted in a support 31 for rotatably holding a rotor. The support 31 for the carrier roller set 30 is mounted on spring mounting elements not shown in detail since such spring mountings are not part of the invention. The spring mountings rest on or in a machine bed of a balancing machine, whereby generally two or several carrier roller sets 30 are employed.

Each individual set 30 includes its own frame 31' supporting two carrier rollers 32 and 33 on which the rotor is supported, for example by its journal pin.

Figure 6:
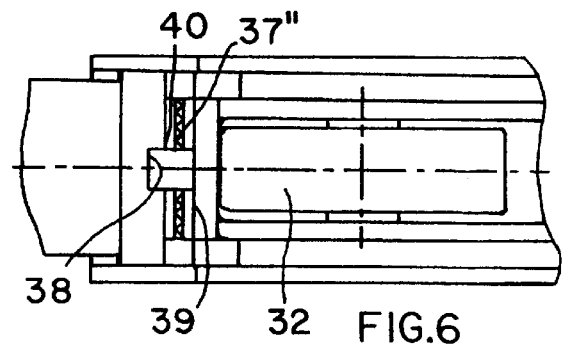
FIG. 6 is a sectional view along section line VI—VI in FIG. 5.
Figure 7:
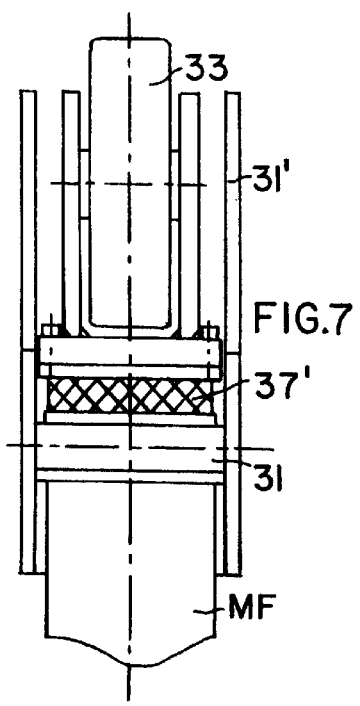
FIG. 7 is a sectional view along section line VII—VII in FIG. 5.

Referring to FIGS. 5, 6 and 7, the carrier rollers 32, 33 are supported with their frame 31' by a vibration damper 37 positioned between support 31 and the frame 31'. The damper 37 includes at least one horizontal vibration damping element 37' and two slanted vibration damping elements 37" and 37'" positioned between two support sur-faces 38, 39; 38', 39' at least one of which is slanting relative to the vertical for applying an axial biasing force component to the elements 37", 37'". The support 31 and the frame 31' form together a cradle C for the rollers 32, 33.

The movability or elastical yieldability of the elastomeric vibration damping elements 37" and 37'" is controllable or may be blocked entirely by the displacement of an adjustment wedge 40 that may be operated, for example by fluidic piston cylinder drives 40A, 40B for applying a vertical force VF which provides a horizontal or axial biasing force component due to the slanting of the surfaces 39, 39'. The fluidic drives are effective to shift the respective wedge 40 up or down between the respective support surfaces 38, 39 and/or 38', 39' formed by a wall of the support 31 and by a wall of the frame 31'. Thus, by simply releasing the vertically directed force VF of the piston cylinder devices 40A, 40B, it becomes possible to establish an effective damping through the vertical movement of the wedges 40 for biasing the elastomeric vibration damping elements 37" and 37'" without substantially diminishing their dynamic bearing or support stiffness. Stated differently, such release of the vertical force VF makes the elastomeric elements 37" and 37'" effective without the occurrence of phase errors that otherwise could falsify the vibrations that are measured for ascertaining the unbalance in the critical r.p.m. range or near the critical r.p.m.

Figure 8:
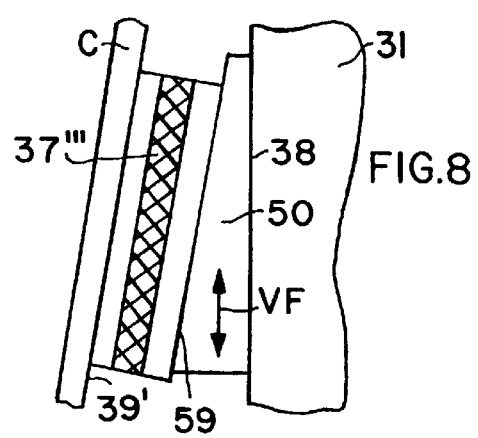
FIG. 8 shows a detail of a position of certain slanted vibration damping sections smaller to the embodiment of FIG. 5.

FIG. 8 illustrates an embodiment wherein a vibration damping intermediate element 37" and 37'" is positioned between two surfaces or wall surfaces extending at a slant relative to the vertical. The carrier roller set 30 is supported in the cradle C that bears with its inner frame 31' through the vibration damper 37 against its outer support 31. An adjustment wedge 50 is positioned to contact with its vertical surface the surface 38 of the support 31 and to face with its slanted surface the inclined surface 59 of the damping intermediate element 37'", whereby the latter is wedged between the wedge 50 and the surface 39 of the cradle C. The arrangement is mirror-symmetrical on the opposite side with regard to the vibration damping element 37". The wedge 50 is vertically displaceable as indicated by the double arrow VF representing a vertical force, for example exerted by a piston cylinder device such as 40A or 40B shown in FIG. 5. In this manner it is simple and easy to apply a biasing force to the respective vibration damping element 37" and/or 37'"or to remove the biasing force. Thus, an effective damping can be adjusted without thereby substantially diminishing the dynamic bearing or support stiffness.

Figure 9:
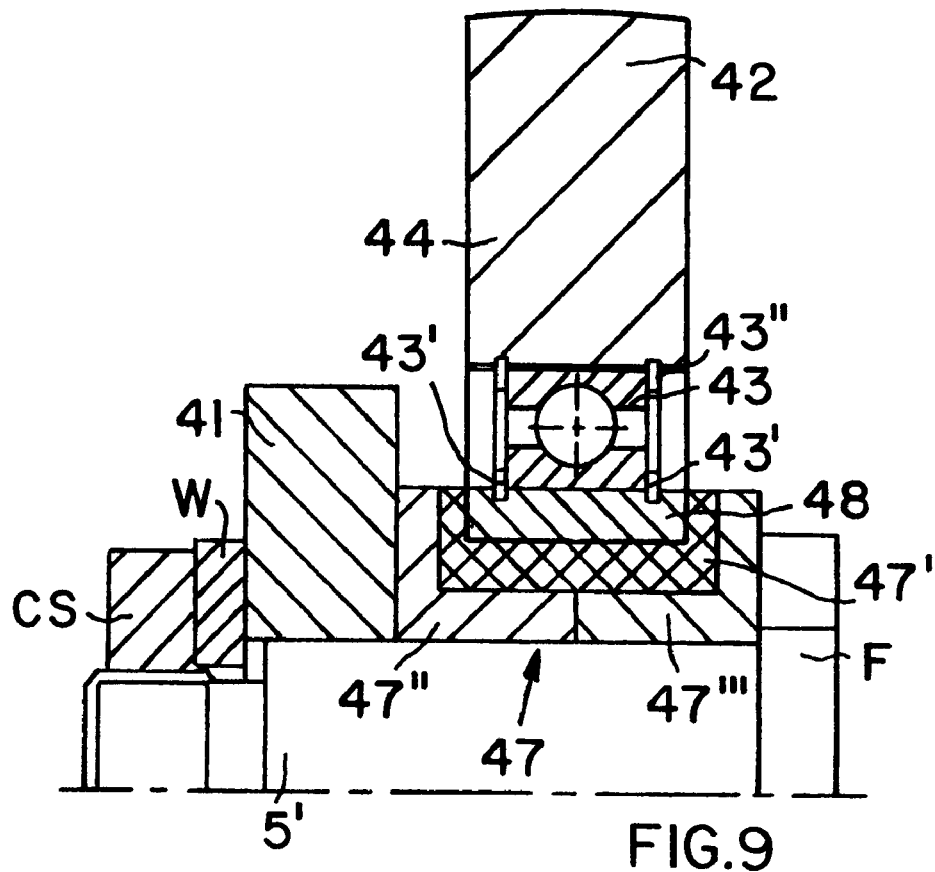
FIGS. 9 and 10 illustrate two different versions of a mounting of a carrier roller unit of a balancing machine with modified vibration damping elements.
Figure 10:
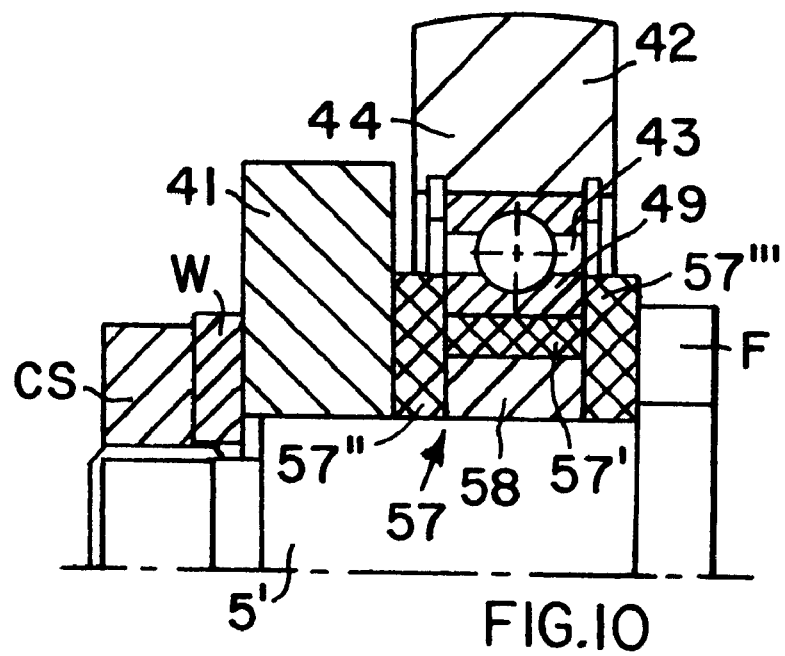

Instead of the cradle C with its base frame 31 and its carrier rollers 32, 33 and with the vibration damping intermediate elements 37', 37", 37' shown in FIG. 5 as a support fur the inner frame 31', a damping device may be provided that is directly effective on the carrier rolLers 32, 33 as is shown in FIGS. 9 and 10, FIGS. 9 and 10 show rotor carrier rollers 42 rotatably supported in a carrier roller support or mounting unit 41 which is part of a conventional balancing machine not shown. The support 41 is mounted to a balancing machine frame MF through damping springs 8 merely shown symbolically in the embodiment of FIG. 1. Generally, at least two or more such units are provided in a balancing machine.

Each carrier roller 42 is supported in the support 41 by bearings 43, preferably antifriction bearings 43 such as ball bearings and by a vibration damping intermediate element 47. The roller 42 has an inner mounting section 44 secured to the outer race of the bearing 43. The rotor or its mounting journal rests on the carrier roller 42. A vibration damping element 47 is interposed between a machine shaft 5' and the inner race of the bearing 43. The element 47 has defined elastic damping characteristics in the radial direction RD and in the axial direction AD.

According to FIG. the intermediate vibration damping element 47 comprises an elastic member 47' between metal rings 48, 47" and 47'". The metal ring 48 is positioned radially outwardly. The inner race of the bearing 43 is secured to the ring 48 by spring rings 43', for example, providing axial restraints. Each of the metal rings 47", 47'" has an L-sectional configuration each with a radially outwardly extending portion or flange and with an axially extending portion or cylinder section. The radially extending portions of the ring sections 47" and 47'" enclose the elastic member 47' and the metal ring 48 in the axial direction. The axially extending portions of the ring sections 47", 47'" enclose the elastic member 47' radially inwardly. The elastic member 47' is formed between the just described metal ring 48 and the axially extending portions or cylinders of the ring sections 47", 47'" by filling the space between these metal rings with polyurethane or rubber either by casting or injection molding.

The carrier roller 42 is secured to the outer bearing race of the bearing 43 by spring rings 43". The element 47 is secured to the shaft 5' and thus to the support 41 against axial displacement between a flange F of the shaft 5' at one end and a clamping nut CS on a threading of the shaft 5' at the other end. A washer W may be used as shown for a proper axial clamping action.

FIG. 10 illustrates a structure similar to that of FIG. 9, however, with a modified vibration damping element 57 constructed of three elastic sections 57', 57" and 57'" similar to the embodiment of FIG. 3A. The axially extending elastomeric section 57' is positioned between the inner race 49', of the bearing 43 and a metal ring 58 on the shaft 5'. The radially extending elastomeric sections 57" and 57'" are positioned similar to ring discs or flanges at each end of the ring 58, the section 57' and the inner race 49'. All members of the vibration damping element 57 are held in place on the shaft 5' between the flange F and the clamping screw CS as in FIG. 9, whereby a washer W may also be used. The ring discs 57", 57'" are preferably made by stamping out of elastomeric sheet material. The carrier roller 42 and the bearing 43 are held in place as described above with reference to FIG. 9.

In FIGS. 9 and 10 the elastomeric vibration damping elements 47, 57 are positioned between the shaft 5' and the inner bearing race 49'. However, the elements may be 47, 57 may be positioned with equal effect between the outer bearing race and the inner section 44 of the carrier roller 42. Similarly to FIG. 4 biasing force adjustment rings 10', 10" may be used as well.

As mentioned above, the advantage of such an arrangement is seen in that phase errors are avoided and thus cannot falsify the r.p.m. measured in the critical r.p.m. range for ascertaining an unbalance of the rotor to be tested. A control of a fluid pressure for the vertical adjustment of the wedges 40 or 50 makes the present system easily adaptable to rotors having different critical r.p.m.s or r.p.m. ranges while simultaneously avoiding any undesirable imposed forces on the system.

Although the invention has been described with reference to specific example embodiments, it will be appreciated that it is intended to cover all modifications and equivalents within the scope of the appended claims.

What is claimed is:

1. A device for supporting a rotor in an unbalance measuring machine, said rotor (5) having a rotation axis, said unbalance measuring machine comprising a machine frame (MF), a support (2; 31; 41) for said rotor (5), spring elastic mounts (S) securing said support (2; 31; 41) in a vibratable manner to said machine frame (MF), said spring elastic mounts (S) being effective for resiliently supporting said support in said machine frame, at least one bearing member (3, 4; 32, 33; 42, 43) rotatably mounting said rotor (5) to said support (2; 31; 41), and at least one vibration damping element (7, 7'; 7A; 7B; 41; 20; 37; 47, 57) having at least one radially effective vibration damping component operatively interposed between said rotor (5) and said support (2; 31; 41) so that said spring elastic mounts (S) and said radially effective vibration damping component are arranged in series with each other between said machine frame and said rotor for adjusting the vibration behavior of the system formed by said rotor and support.

2. The device of claim 1, wherein said radially effective vibration damping component (7, 20) is interposed between said bearing member (3, 4) and said support (2).

3. The device of claim 1, wherein said radially effective vibration damping component (7B) is interposed between said bearing member and said rotor (5).

4. The device of claim 1, wherein said radially effective vibration damping component comprises an elastomeric member.

5. The device of claim 1, wherein said radially effective vibration damping component comprises at least one metal member and one elastomeric member bonded to each other to form a metal elastomer composite structure.

6. The device of claim 1, further comprising a force applicator for applying a defined biasing force to said radially effective vibration damping component.

7. The device of claim 1, wherein said at least one bearing member (3, 4) is an antifriction bearing, wherein said rotor (5) is secured to a shaft which in turn is mounted in said antifriction bearing (3, 4), and wherein said radially effective vibration damping component (11) is positioned between an outer race (3B, 4B) of said antifriction bearing (3, 4) and said support (2).

8. The device of claim 7, wherein said vibration damping element (11) comprises a plurality of separate vibration damping components.

9. The device of claim 8, wherein each of said separate vibration damping components of said vibration damping element comprises a metal elastomer composite ring structure having an L-cross-sectional configuration providing at least one axially effective vibration damping component and said at least one radially effective vibration damping component.

10. The device of claim 8, wherein said plurality of separate vibration damping components of said vibration damping element (17) comprises a radially effective cylindrical elastomeric ring (17') surrounding an outer race (3B, 4B) of said bearing member (3, 4) and two axially effective ring disks (17", 17''') contacting axially facing surfaces of said outer race (3B, 4B) of said bearing member (3, 4).

11. The device of claim 1, wherein said bearing member (30) comprises two carrier rollers (32, 33, 42) rotatably mounted in said support (31, 41) for rotatably carrying said rotor, and wherein said radially effective vibration damping component (37, 47, 57) is positioned between said carrier rollers (32, 33, 42) and said support (31, 41).

12. The device of claim 1, wherein said vibration damping element (37) comprises a plurality of vibration damping components including a first component (37') positioned for vibration damping in a radial direction relative to said rotation axis of said rotor (5), a second component (37") positioned laterally on one side of one carrier roller (32) of said two carrier rollers for vibration damping approximately in a horizontal direction, and a third component (37''') positioned laterally on the opposite side of the other carrier roller (33) of said two carrier rollers for vibration damping approximately in a horizontal direction.

13. The device of claim 12, wherein said support (31) further comprises two pairs of first and second support walls (38, 38'; 39, 39') positioned laterally between said support (31) and said two carrier rollers (32, 33), said first and second support walls of a pair being spaced from each other to form a gap between said support walls of a pair, said second and third vibration damping components (37", 37''') being positioned in said gap respectively, and a force applicator (40, 50) positioned for applying a biasing force component to a respective one of said second and third vibration damping components (37", 37''').

14. The device of claim 13, wherein said first support wall (38, 38') of a pair extends substantially vertically, wherein said second support wall (39, 39') of said pair extends at a slant relative to said first support wall, whereby said gap has a wedge shape, and wherein said force applicator comprises a wedge (40, 50) between each pair of first and second support walls, said wedge being movable in said gap for applying said biasing force component.

15. The device of claim 11, wherein said vibration damping element comprises a plurality of components (37', 37", 37''') positioned to form a trough or cradle for said carrier rollers.

16. The device of claim 1, wherein said radially effective vibration damping component (11, 20, 47, 57) comprises an elastomeric cylinder.

17. The device of claim 16, wherein said bearing member comprises a bearing race, and wherein said elastomeric cylinder (11) is inserted between said bearing race and said support.

18. The device of claim 16, wherein said support comprises a first inner support section (12) and an outer support section (13), and wherein said elastomeric cylinder (11), is positioned between said inner (12) and outer (13) support sections.

19. The device of claim 18, further comprising a biasing force applicator positioned for radially biasing said elastomeric cylinder.

20. The device of claim 1, wherein said vibration damping element comprises an elastomeric bushing (20, 47), said apparatus further comprising a biasing force applicator positioned for radially biasing said elastomeric bushing.

21. The device of claim 20, wherein said biasing force applicator comprises a first inner clamping ring (10') surrounding said elastomeric bushing and having a first slanted surface facing substantially radially outwardly, said biasing force applicator further comprising a second outer clamping ring (10") having a second slanted surface facing substantially radially inwardly, said first and second slanted surfaces cooperating with each other in applying a radial biasing force component to said elastomeric bushing, and a drive (9) for axially displacing one of said first and second clamping rings (10', 10") relative to the other clamping ring for applying said radial biasing force component.

22. The device of claim 1, wherein said vibration damping element (47) comprises a radially outer first metal ring (48), at least one second metal ring (47) having an axially extending cylinder section positioned radially inwardly of said first metal ring (48), said second metal ring having a radially extending flange at each end of said axially extending cylinder section, and wherein said radially effective elastic component (47') is positioned between said first and second metal rings (48, 47).

23. The device of claim 22, wherein said second metal ring comprises two portions (47" and 47'''), each portion having an L-sectional configuration so that one leg of said L-sectional configuration forms said radially extending flange and the other portion of said L-sectional configuration forms part of said axially extending cylinder section.

24. The device of claim 1, wherein said vibration damping element (57) comprises a cylindrical metal ring (58) and an elastic member comprising three elastic sections (57', 57", and 57'''), said three elastic sections including a cylindrical elastic ring section (57') forming said radially effective vibration damping component surrounding said metal ring (58) and two radially extending elastic flange sections (57" and 57''') one of which is positioned at each end of said cylindrical metal ring (58) and of said cylindrical elastic ring section (57').

25. The device of claim 24, wherein said radially extending elastic flange sections (57" and 57''') cover axially facing ends of said cylindrical metal ring (58) and of said cylindrical elastic ring section (57') forming said radially effective component, wherein said bearing member (43) comprises an inner race having axially facing surfaces also covered by said elastic flange sections (57", 57''').

* * * * *

UNITED STATES PATENT AND TRADEMARK OFFICE
CERTIFICATE OF CORRECTION

PATENT NO. : 6,007,252
DATED : Dec. 28, 1999
INVENTOR(S) : Thelen et al.

It is certified that error appears in the above-identified patent and that said Letters Patent is hereby corrected as shown below:

On the title page
in [56], line 3, after "Bowen" insert --et al.--;

Col. 3, line 37, after "sections" replace "smaller" by --similar--;

Col. 4, line 33, after "be" insert "introduced";

Col. 5, line 30, after "in" insert --turn--;

Col. 7, line 5, after "springs" replace "8" by --S--;

Col. 7, line 11, before "roller" insert --carrier--;

Col. 7, line 11, after "inner " delete --mounting--;

Col. 7, line 61, after "elements" delete -- may be--;

Signed and Sealed this

Twenty-second Day of August, 2000

*Attest:*

Q. TODD DICKINSON

*Attesting Officer*   *Director of Patents and Trademarks*